2,882,257

POLYESTER FILM OF 2-BUTENE-1,4-DIOL AND METHYL VINYL ETHER-MALEIC ANHYDRIDE COPOLYMER CROSSLINKED WITH N-VINYL-2-PYRROLIDONE AND PROCESS FOR PREPARING SAME

Frederick A. Hessel, Upper Montclair, N.J., and Gerald Robinson, New York, N.Y., assignors to General Aniline & Film Corporation, New York, N.Y., a corporation of Delaware No Drawing. Application April 19, 1957
Serial No. 653,757

3 Claims. (Cl. 260—45.4)

This invention relates to a new cross-linked copolymeric polyester which is particularly adaptable for surface coatings.

We have found that a new cross-linked copolymeric polyester, which yields water-insoluble films of excellent properties, is readily prepared by simultaneously disesterifying methyl vinyl ether-maleic anhydride copolymer with 2-butene-1,4-diol to yield a copolymeric polyester which in the presence of N-vinyl-2-pyrrolidone and the application of heat yields a cross-linked copolymeric polyester which may be characterized by the following formula:

(A)

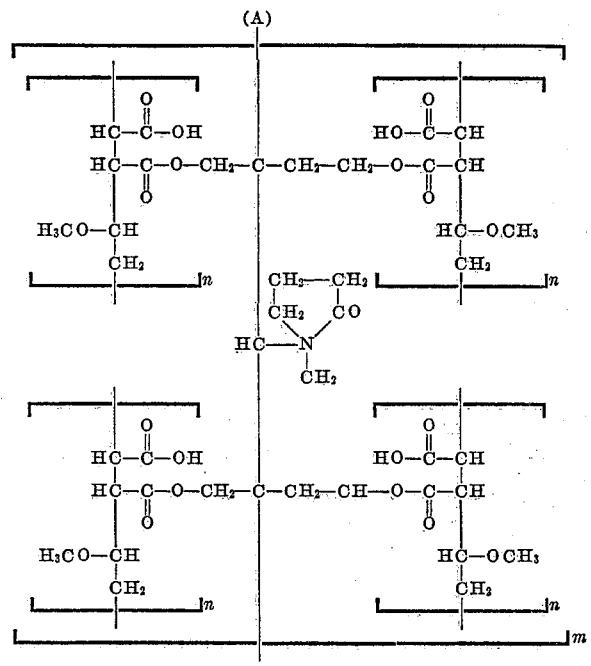

wherein each of the $n$'s represent a chain of 5 to 2,000 monomer units of partially esterified methyl vinyl ether-maleic anhydride, and $m$ represents an integer ranging from $$1 \text{ to } \frac{n}{2}$$

which corresponds to a molecular weight of 2,500 up to as high as $1 \times 10^6$.

The cross-linked copolymeric polyester having the foregoing structure shows excellent adhesion to various types of surfaces such as wood, glass, metals, paper, cloth, etc. and is unusually adaptable as a rust-preventive coating for metallic parts. The cross-linked copolymeric polyester is applied directly from an aqueous solution. The cross-linked copolymeric polyester, after coating and heating the coated surface to a temperature ranging from 130°–210° C. yields coatings or films which show not only excellent resistance to water but also resistance to exposure to ultraviolet light. It also possesses exceptionally good heat resistance and in view of this property is especially useful in the preparation of bake-type enamel when mixed with pigments.

In preparing the cross-linked copolymeric polyester of the present invention, we prepare an aqueous mixture containing approximately 1 mole of methyl vinyl ether-maleic anhydride copolymer, hereinafter referred to for sake of simplicity as PVM/MA, 1 mole of 2-butene-1,4-diol and ½ mole of N-vinyl-2-pyrrolidone either in the presence or absence of a catalyst and heating the mixture to a temperature ranging between 130° and 210° C. During this heat treatment, the maleic-anhydride ring hydrolyzes in each monomer unit to yield two carboxylic acid groups, one of which in each monomer unit esterifies with 2-butene-1,4-diol to form a diester which may be characterized by the following formula:

(B)

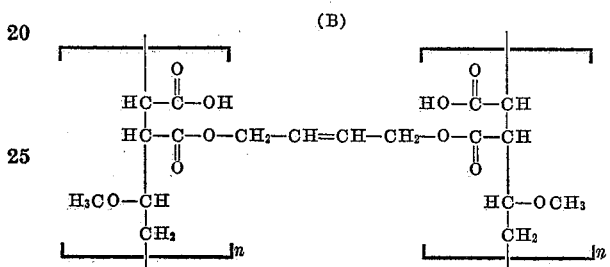

wherein the $n$'s have the same value given above. Simultaneously, i.e. during diesterification, the N-vinyl-2-pyrrolidone cross-links the copolymeric polyester. The unusual feature in the preparation of cross-linked copolymeric polyesters is that the simultaneous diesterification and cross-linking at elevated temperatures takes place in an aqueous medium. In view of this feature the PVM/MA is preferably employed in aqueous solution wherein the concentration may range from 10 to 35% PVM/MA. It is to be noted that in the event an excess of 2-butene-1,4-diol and/or N-vinyl-2-pyrrolidone is employed, this has no effect on the diesterification and cross-linking reaction whatsoever with the exception that there may be some unreacted 2-butene-1,4-diol and N-vinyl-2-pyrrolidone which are water-soluble and, if the water solution of the cross-linked material is applied as a coating they may be either washed out with water or evaporated off during the heat treating step.

It is to be further noted that one repeating monomer unit of PVM/MA has a molecular weight of 156. Therefore for each 156 parts by weight of PVM/MA 1 mole or 88.1 parts by weight of 2-butene-1,4-diol and ½ mole or 111.13 parts of N-vinyl-2-pyrrolidone are employed in the simultaneous diesterification and cross-linking.

Another unusual feature of the present invention is that the cross-linked copolymeric polyester is prepared in situ and applied directly from the aqueous medium to all types of coating applications. Heating the cast film between 130° and 210° C. results in a hard, glossy film.

The specific viscosity of the PVM/MA, prior to the making up of an aqueous solution, may range from 0.2 to 3 and the viscosity coefficient (K) may range from 10 to 200 depending upon the extent of copolymerization. The PVM/MA has molecular weights ranging from 500 to 250,000. Viscosity measurements are used as an indication of the average molecular weight of the copolymers. The viscosity coefficient, K, is fully described in Modern Plastics 23, No. 3, 157–61, 212, 214, 216, 218 (1945), and is calculated as follows:

$$\frac{\log \eta \text{ rel}}{C} = \frac{75k^2}{1+1.5kC} + k$$

where C is the concentration in grams per 100 cc. of copolymer solution in 2-butanone (methylethyl ketone) at 25° C. and $\eta$ rel is the ratio of the viscosity of the solution to that of pure 2-butanone. The K values are reported as 1000 times the calculated viscosity co-efficient in order to avoid the use of decimals. The specific viscosity as employed herein means the relative viscosity minus one at 1 gram of the copolymer in 100 ml. of 2-butanone. The direct intrinsic viscosity which corresponds to a K value of 10 to 200 ranges from 0.040 to 7.37 respectively.

The number of recurring copolymer units enclosed by $n$'s in the brackets of both the formulae of the copolymeric polyester B and the cross-linked copolymeric polyester A indicate the extent or degree of copolymerization and correspond to a chain of 5 to 2000 monomer units. In Formula A $m$ represents an integer ranging from $$1 \text{ to } \frac{n}{2}$$

which corresponds to a molecular weight of 2500 to as high as $1 \times 10^6$.

The PVM/MA copolymers utilized in accordance with the present invention are available on the open market and are readily prepared by conventional methods well known to those skilled in the polymer and copolymer art.

In practicing the present invention, 100 parts by weight of a 10–35% aqueous solution of PVM/MA having a K value ranging from 10 to 200, preferably between 30 and 100, is mixed in a large glass vessel with 11 parts by weight of 2-butene-1,4-diol and 7 parts by weight of N-vinyl-2-pyrrolidone with or without a catalytic amount of organic peroxide such as benzoyl peroxide, lauroyl peroxide, tert-butyl hydroperoxide, etc. or $\alpha,\alpha'$-azodiisobutyronitrile. The solution is then stirred and coated on glass, wood, steel or other surfaces and the coating or film heated for a few minutes, i.e. 3 to 7 minutes, at approximately 130°–210° C. to yield smooth and shiny films.

In addition to the three components, i.e. aqueous PVM/MA, 2-butene-1,4-diol and N-vinyl-2-pyrrolidone, with or without the presence of a catalyst, various pigments, dyes and fillers may be added and the resulting solution cast and heated to yield excellent films and coatings.

The invention will be described in greater detail in conjunction with the following examples. It is to be understood however, that these examples are merely illustrative and are not intended to limit the scope of the invention claimed herein.

*Example I*

To a 500 cc. beaker were added 100 grams of a 20% aqueous solution of PVM/MA having a K value of 50, 11 grams of 2-butene-1,4-diol and 7 grams of N-vinyl-2-pyrrolidone and a small amount, approximately 0.9 gram, of $\alpha,\alpha'$-azodiisobutyronitrile. The solution was well stirred, then cast on a glass plate and allowed to dry at room temperature. The resulting film was then heated at approximately 163° C. for 6 minutes and yielded a very smooth, non-tacky, shiny film with excellent adhesion to glass.

The coated glass plate was then placed in a beaker of water and the water boiled for 30 minutes without any apparent effect on the cast film.

*Example II*

Example I was repeated with the exception that prior to casting on a glass plate, 40 grams of titanium dioxide powder were mixed thoroughly in the solution until a homogeneous paste results. The paste was then coated on a glass plate, dried at room temperature and then heated for 6 minutes at approximately 176° C. The resulting film showed excellent adhesion. The paste may be employed as a white enamel-type paint.

*Example III*

5 grams of a dyestuff obtained on the open market under the brand name of Heliogen Green GTA Paste, 20 grams of PVM/MA (as a 20% aqueous solution) having a K value of 100, 2 grams of 2-butene-1,4-diol, 1 gram of N-vinyl-2-pyrrolidone and 0.5 gram of $\alpha,\alpha'$-azodiisobutyronitrile. The components were thoroughly mixed. The resulting mixture was so well dispersed that additional dispersing agents normally used in conjunction with phthalocyanine pastes could be dispensed with. The mixture was padded on cloth made of woven glass fibres and heated for 10 minutes at 176° C. The resulting cloth was dyed very evenly and showed excellent resistance to a No. 1 standard ASTM wash test. The crock resistance, both wet and dry, was excellent. This particular mixture gives comparable results on cotton and nylon with the exception that these particular cloths withstand a No. 3 standard ASTM wash test.

In connection with this example, it is to be noted that varying the ratios of pigment, dye or other coloring matter makes no difference in the properties of the resulting film with the possible exception of imparting lighter or darker shades.

Although theoretically, equimolar ratios of PVM/MA and 2-butene-1,4-diol may be used, it is to be noted, as pointed out above, that wide variations of these ratios may be employed and still yield satisfactory cross-linked copolymeric polyesters.

The only factor that is critical, as has been observed in the working out of the foregoing examples, is the time of heating, and accordingly, variations in heating are very important. 3 minutes at 130–155° C. appears to be the minimum. Higher temperatures (up to 210° C.) and longer cross-linking time improves the physical properties of the resulting film proportionately.

We claim:

1. A dry cross-linked copolymeric polyester film obtained by casting a film from an aqueous mixture comprising 1 mole of methyl vinyl ether-maleic anhydride copolymer having a K value from 10 to 200, 1 mole of 2-butene-1,4-diol and ½ mole of N-vinyl-2-pyrrolidone and heating the cast film to a temperature of 130° to 210° C. until a dry film of the said polyester is obtained.

2. The process of preparing a dry cross-linked copolymeric polyester film which comprises mixing in water 1 mole of methyl vinyl ether-maleic anhydride copolymer having a K value of 10 to 200, and 1 mole of 2-butene-1,4-diol with ½ mole of N-vinyl-2-pyrrolidone, followed by casting a film from the mixture and heating the resulting film to a temperature ranging from 130° to 210° C. until a dry film of said polyester is obtained.

3. The process of preparing a dry cross-linked copolymeric polyester film which comprises mixing in water 1 mole of aqueous methyl vinyl ether-maleic anhydride copolymer having a K value ranging from 10 to 200, 1 mole of 2-butene-1,4-diol, and ½ mole of N-vinyl-2-pyrrolidone in the presence of a catalytic amount of a catalyst selected from the group consisting of organic peroxides and $\alpha,\alpha'$-azodiisobutyronitrile and stirring the mixture to yield an aqueous solution which is then cast into a film and the film heated at 130–210° C. until dry.

No references cited.